United States Patent Office 2,954,401
Patented Sept. 27, 1960

2,954,401

COMPOUNDS CONTAINING BORON AND NITROGEN

Stephen J. Groszos and Stanley F. Stafiej, Stamford, Conn., assignors to American Cyanamid Company, New York, N.Y., a corporation of Maine No Drawing. Filed Feb. 21, 1958, Ser. No. 716,542

3 Claims. (Cl. 260—551)

This application is a continuation-in-part of our co-pending applications Serial Nos. 647,934; 647,935; and 647,936, filed March 25, 1957, the last of the aforesaid applications having been abandoned in favor of the instant application. Application Serial No. 647,934 has now matured into Patent No. 2,892,869, dated June 30, 1959.

This invention relates to new chemical compounds and more particularly to new compounds containing boron and nitrogen. Still more particularly, the invention is concerned with new and useful substituted borazoles.

A review of borazoles by E. Wiberg appears in Naturwissenschaften, 35, 182, 212 (1948).

The borazoles of this invention may be represented graphically by the following general formula:

(I)

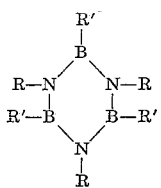

where R represents a member of the class consisting of hydrogen and alkyl (including cycloalkyl), aralkyl, aryl, and alkaryl radicals, and R' represents a monoethylenically unsaturated, aliphatic, hydrocarbon radical containing at least 2 and not more than 4 carbon atoms.

Illustrative examples of hydrocarbon radicals represented by R in the above formula are: methyl, ethyl, propyl, isopropyl, butyl, isobutyl, sec.-butyl, amyl, iso-amyl, hexyl to tetracontyl, inclusive (both normal and isomeric forms), cyclopentyl, cyclohexyl, cycloheptyl, etc.; benzyl, phenylethyl, phenylpropyl, phenylisopropyl, phenylbutyl, fluorenyl, dinaphthylenemethyl, etc.; phenyl, biphenylyl or xenyl, naphthyl, anthryl, naphthyl-substituted anthryl and dianthryl, etc.; and tolyl, xylyl, ethylphenyl, propylphenyl, isopropylphenyl, butylphenyl, etc. Illustrative examples of radicals represented by R' are vinyl, allyl, methallyl, propenyl, isopropenyl (β-allyl), 1-butenyl, 2-butenyl (crotyl) and 3-butenyl.

The new compounds of this invention range from liquids to semi-solids and solids in normal state. They are useful, for instance, as components of flame-resisting compositions; as plasticizers; as fuel additives; as cross-linking agents in resinous compositions; as scintillation counters; as the active ingredient in insecticides, bactericides, germicides, fungicides, pesticides, and the like; as a chemical intermediate for use in the preparation of other compounds; as a component of arc-extinguishing tubes, and especially of surfaces that are exposed to the action of the arc. They also can be employed alone or in combination with other substances that are copolymerizable therewith to yield new synthetic materials (homopolymers and copolymers) having particular utility in the plastics and coating arts. In any of these and other applications or uses, one can employ a single compound of the kind embraced by Formula I or a plurality of such compounds in any proportions. They can be used in conjunction with any of the conventional components of flame-resisting compositions, plasticizers, insecticides, bactericides, germicides, fungicides, pesticides, etc.

Preferred compounds of this invention are B,B',B''-trivinyl-N,N',N''-triphenylborazole and B,B',B''-triallyl-N,N',N''-triphenylborazole. The formula for the first-named compound, which also may be named as B-trivinyl-N-triphenylborazole, is (II)

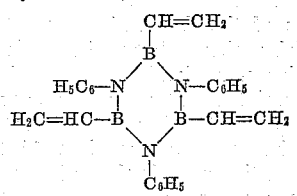

The formula for B,B',B''-triallyl-N,N',N''-triphenylborazole, which also may be designated as B-triallyl-N-triphenylborazole, is (III)

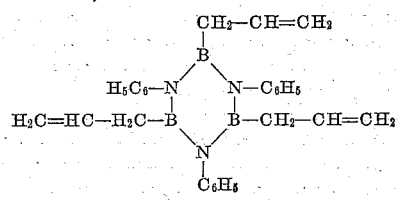

Other compounds embraced by Formula I that are within the scope of this invention (and which, for purpose of brevity, are named by the shorter nomenclature just indicated) include, for example, the following:

B-trivinyl-N-trixenylborazole
B-trimethallyl-N-tritolylborazole
B-trivinyl-N-trimethylborazole
B-triallyl-N-trimethylborazole
B-tricrotyl-N-tribenzylborazole
B-trivinyl-N-tri(methylcyclohexyl)borazole
B-triallyl-N-tricyclohexylborazole
B-trivinyl-N-trixylylborazole
B-triallyl-N-trixylylborazole
B-trivinyl-N-trieicosylborazole
B-triallyl-N-trioctadecylborazole
B-trivinylborazole, the formula for which is (IV)

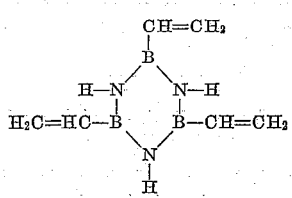

B-triallylborazole, the formula for which is (V)

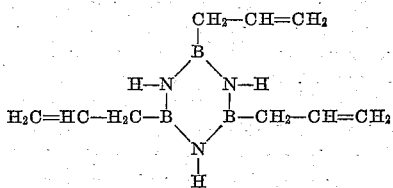

The compounds of this invention can be prepared by different methods. One suitable method comprises the dropwise addition of the appropriate Grignard reagent, R'MgX, where R' has the same meaning given above with reference to Formula I and X represents a halogen, specifically Cl, Br or I, to a slurry of the appropriate B,B',B''-trichloroborazole suspended in a suitable liquid solvent that is inert during the reaction, e.g., ethers, dioxane, aromatic and aliphatic hydrocarbons, chlorobenzene, etc. The trichloroborazole employed is one represented by the general formula (VI)
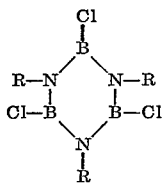

where R has the same meaning as that given above with reference to Formula I.

The addition of the Grignard reagent to the suspension of the trichloroborazole can be carried out at temperatures of, for example, from about 1° or 2° C. up to the boiling point of the particular solvent employed. After addition of the Grignard reagent over a period of up to about 3 hours, e.g., from about ½ to 2 hours, is complete, the reaction mass is allowed to reflux or is kept at a temperature at or above room temperature for a period of from a few minutes to several hours. After cooling to room temperature (if not already at that temperature) the unconsumed Grignard reagent is removed by any suitable means, e.g., by treating the mass with a suitable material that will react with the excess Grignard reagent. One example of such a material is an aqueous solution of an acid, for instance HCl.

A preferred method of isolating the borazole compound involves the careful titration of the reaction mass with a saturated aqueous ammonium chloride solution to the point at which the magnesium salts separate from a clear solution of the reaction product. After decanting and washing the solid residue with ether, the combined solutions are dried over anhydrous magnesium sulfate for about 16 hours at refrigerator temperature (0°–5° C.), filtered, the filtrate concentrated by volatilizing the solvent, and methanol added to the hot solution until the latter becomes cloudy. After allowing this solution to stand at room temperature or lower, crystals of the product slowly form. Crystallization is completed by cooling to 0°–5° C. (or below 0° C. if necessary) for from several minutes to one hour. The product is then filtered and air-dried. It can be recrystallized from an ether-methanol mixture or from other suitable solvents or solvent mixtures.

In order that those skilled in the art better may understand how the present invention can be carried into effect, the following examples are given by way of illustration and not by way of limitation. All parts and percentages are by weight.

EXAMPLE 1

A. *Preparation of B,B',B''-trichloro-N,N',N''-triphenylborazole*

A three-necked, 500 ml. flask equipped with stirrer, Dry-Ice condenser, and a Claisen head provided with a nitrogen inlet tube and a "Drierite" drying tube is charged with 200 ml. of toluene (freshly distilled over sodium or preferably calcium hydride) and cooled in an ice-water bath while being swept with dry nitrogen. Boron trichloride (50 g.; 0.43 mole; slightly more than one equivalent to take care of slight loss due to hydrolysis) is distilled into the flask through the Dry-Ice condenser, causing a brownish-purple color to develop in the toluene solution. After replacing the drying tube with an addition funnel and protecting the exit of the condenser from moisture by a drying tube, a solution of aniline (30.4 g.; 0.326 mole) in toluene (100 ml.) is added dropwise with stirring over a one-hour period. An immediate precipitate of the addition compound $$(C_6H_5-NH_2:BCl_3)$$

separates from the purple-colored solution. The cooling bath is replaced by a heating mantle; the Dry-Ice condenser is also replaced by a water condenser, the outlet of which is connected by a rubber tubing to an inverted funnel held about 4 cm. above a beaker of water. The reaction mixture is then refluxed until evolution of HCl and $BCl_3$ has ceased (24 hours). During this period the color of the solution changes from purple to a light brown. The solvent is slowly removed by distillation until the product begins to separate from solution. After allowing the mixture to cool to room temperature, the crystalline, almost colorless product is collected by rapid filtration. Yield: 32.6 g. (73%). A small portion recrystallized from dry benzene (filtered through glass wool) has M.P. 270°–272° C.; Jones and Kinney (J.A.C.S. 61, 1378 [1939]) report M.P. 265°–270° C. Since the compound is quite susceptible to hydrolysis by moisture, it should be protected from moisture, e.g., by storing in a desiccator over a suitable drying agent or in a container to which enough benzene or toluene is added to wet the solid.

B. *Preparation of B,B',B''-triallyl-N,N',N''-triphenylborazole*

Allyl magnesium bromide is prepared in, for instance, the following manner:

Allyl bromide (26.4 g.; 0.218 mole) in 50 ml. of ether is added to 5.3 g. (0.218 mole) magnesium turnings covered with 100 ml. of ether. Reaction starts immediately upon the addition of a crystal of iodine. After all of the allyl bromide has been added, the Grignard mixture is refluxed for 2 hours. A clear, ether solution of allyl magnesium bromide is obtained.

The above solution is added dropwise over a 45-minute period to 15.0 g. (0.0364 mole) B,B',B''-trichloro-N,N',N''-triphenylborazole (product of A) suspended in 100 ml. of anhydrous ether. A mushy solid replaces the suspended B-trichloro-N-triphenylborazole during the course of the addition. After adding all the Grignard reagent, the reaction mass is refluxed for 2 hours, after which the unreacted allyl magnesium bromide is decomposed with saturated aqueous ammonium chloride solution. The amount of ammonium chloride solution to be added is determined by the point at which the magnesium salts separate from an almost colorless, clear ether solution. After decanting and washing the solid residue with ether the combined ether solutions are dried over anhydrous magnesium sulfate for about 16 hours at refrigerator temperature. The ether solution is separated from the magnesium sulfate and concentrated to a volume of approximately 100 ml., at which point the solution is orange-yellow in color. Methanol is added to the refluxing solution until it becomes cloudy without depositing any crystalline material. After standing undisturbed at room temperature for several hours nicely formed, large crystals of product slowly separate from the solution. Precipitation is completed by placing the vessel containing the product in the refrigerator for about ½ hour or longer. The B,B',B''-triallyl-N,N',N''-triphenylborazole is collected by filtration and air-dried to give 12.2 g. of product (78% of theory); M.P. 95°–98° C. Recrystallization from an ether-methanol mixture yields colorless crystals; M.P. 98°–99° C. Analysis checks with the analysis of a sample of B,B',B''-triallyl-N,N',N''-triphenylborazole (prepared in essentially the same manner as that described above), M.P. 98°–99° C., and which analyzed as follows:

| | Carbon | Hydrogen | Nitrogen |
|---|---|---|---|
| Calculated for $C_{27}H_{30}N_3B_3$ | 75.59 | 7.05 | 9.79 |
| Found | 75.11 | 7.15 | 9.87 |

Essentially the same procedure is followed as described under Example 1 in preparing and isolating other borazoles of the kind embraced by Formula I, using amounts of the appropriate Grignard reagent and halogenoborazole equivalent to those employed in Example 1. The reactants and products are shown in Table I, which follows. From fair to good yields of product are obtained in the individual case.

The following example illustrates one use of the compounds of the present invention.

EXAMPLE 14

Ten (10) parts of B,B',B''-triallyl-N,N',N''-triphenylborazole is dissolved in 90 parts of benzene (in which it

TABLE I

| Example | Halogenoborazole | Grignard Reagent | Product |
|---|---|---|---|
| 2 | B,B',B''-trichloroborazole | Methallyl magnesium bromide | B,B',B''-trimethallylborazole. |
| 3 | B,B',B''-trichloro-N,N',N''-triethylborazole. | Allyl magnesium bromide | B,B',B''-triallyl-N,N',N''-triethylborazole. |
| 4 | B,B',B''-trichloro-N,N',N''-tritolylborazole. | ____do____ | B,B',B''-triallyl-N,N',N''-tritolylborazole. |
| 5 | B,B',B''-trichloro-N,N',N''-tricyclohexylborazole. | Propenyl magnesium bromide | B,B',B''-tripropenyl-N,N',N''-tricyclohexylborazole. |
| 6 | B,B',B''-trichloro-N,N'-N''-tribenzylborazole. | Allyl magnesium bromide | B,B',B''-triallyl-N,N',N''-tribenzylborazole. |
| 7 | B,B',B''-trichloro-N,N',N''-triphenylborazole. | Methallyl magnesium bromide | B,B',B''-trimethallyl-N,N',N''-triphenylborazole. |

EXAMPLE 8

*Preparation of B,B',B''-trivinyl-N,N',N''-triphenylborazole*

Vinyl magnesium bromide is prepared by slowly adding a solution of vinyl bromide (15.4 ml.; 0.218 mole) in tetrahydrofuran (50 ml.) to a suspension of magnesium (5.3 g.; 0.218 g. atom) in tetrahydrofuran (100 ml.). The resulting solution is then added dropwise over a 1 hour period to a suspension of 15 g. (0.0364 mole) of B-trichloro-N-triphenylborazole in 100 ml. of tetrahydrofuran. After refluxing for 1½ to 2 hours, the tetrahydrofuran is stripped off under vacuum and the light brown solid which results is taken up in hot hexane. The hexane solution is washed with a small amount of water, dried, and concentrated to about 75 ml. A white, crystalline product comprising B,B',B''-trivinyl-N,N',N''-triphenylborazole is formed on cooling and this is collected by filtration. The mother liquor furnished additional product. Total weight: 6.3 g., yield: 51%.

The melting point of an analytical sample obtained by recrystallizing the less pure product from hexane is 174°–176° C.

| | C | H | B | N |
|---|---|---|---|---|
| Analysis: | | | | |
| Calc. for $C_{24}H_{24}B_3N_3$, percent | 74.47 | 6.26 | 8.39 | 10.86 |
| Found, percent | 73.87 | 6.82 | | 11.40 |
| | 74.77 | 6.47 | 8.22 | 11.11 |

Using vinyl magnesium bromide as the Grignard reagent, essentially the same procedure is followed as described under Example 8 in preparing other vinyl-substituted borazoles (all of which are embraced by Formula I), using amounts of the vinyl magnesium bromide and of the halogenoborazole equivalent to those employed in Example 8. The halogenoborazole reactants and products are shown in Table II which follows. From fair to good yields of product are obtained in the individual case.

is very soluble), and about 0.3 part of a 75% solution of pinane hydroperoxide in pinane is added thereto. The mixture is agitated to obtain a homogeneous solution, after which a portion is cast on a glass plate. The coated plate is placed in an oven maintained at about 150° C. After about 6 hours at this temperature, homopolymerization of the monomer is evident. The resulting film of polymer is insoluble in benzene, which is a good solvent for the monomer.

The monomer used in this example, as well as other borazoles embraced by Formula I, can be copolymerized with other copolymerizable ingredients including, for example, (a) resins possessing a plurality of polymerizably reactive alpha,beta-enal groups, (b) compounds which are different from the borazoles of Formula I and which contain a $CH_2=C<$ grouping, and (c) mixtures of (a) and (b). Specific examples of such copolymerizable ingredients are given in Patent No. 2,510,503, dated June 6, 1950, and in the patents referred to therein, and by reference thereto are made a part of this specification.

The compounds of this invention are unique in that they combine in one molecule a plurality of polymerizably reactive groupings attached directly to a 6-membered ring structure having both boron and nitrogen atoms in the ring. The advantages of such compounds in plastics, coating, laminating, adhesive, impregnating and other applications will be immediately apparent to those skilled in these arts.

In our copending application, Serial No. 716,541, filed concurrently herewith as a continuation-in-part of our copending application Serial No. 647,936, filed March 25, 1957, we have claimed homopolymers and copolymers of those borazoles embraced by Formula I wherein R' represents the allyl radical, $—CH_2—CH=CH_2$; and in the copending application of Joseph J. Pellon, Serial No. 716,559, also filed concurrently herewith, claims are made to certain copolymers of those borazoles embraced by Formula I wherein R' represents the vinyl radical, $—CH=CH_2$.

TABLE II

| Example | Halogenoborazole | Product |
|---|---|---|
| 9 | B,B',B''-trichloroborazole | B,B',B''-trivinylborazole. |
| 10 | B,B',B''-trichloro-N,N',N''-triethylborazole. | B,B',B''-trivinyl-N,N',N''-triethylborazole. |
| 11 | B,B',B''-trichloro-N,N',N''-tritolylborazole. | B,B',B''-trivinyl-N,N',N''-tritolylborazole. |
| 12 | B,B',B''-trichloro-N,N',N''-tribenzylborazole. | B,B',B''-trivinyl-N,N',N''-tribenzylborazole. |
| 13 | B,B',B''-trichloro-N,N',N''-tricyclohexylborazole. | B,B',B''-trivinyl-N,N',N''-tricyclohexylborazole. |

We claim:
1. Chemical compounds represented by the general formula

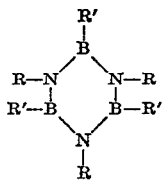

where R represents a member of the class consisting of hydrogen and alkyl, aralkyl, aryl, and alkaryl radicals, and R' represents a monoethylenically unsaturated, aliphatic, hydrocarbon radical containing at least 2 and not more than 4 carbon atoms.
2. B,B',B''-trivinyl-N,N',N''-triphenylborazole.
3. B,B',B''-triallyl-N,N',N''-triphenylborazole.

References Cited in the file of this patent
UNITED STATES PATENTS
2,821,463    Scott et al. _____ Jan. 28, 1958

OTHER REFERENCES
Groszos et al.: Abstracts of Papers—American Chemical Society; 131st Meeting, April 7–12, 1957, page 54–O.
Wiberg et al.: Zeitschrift für Anorganische und Allgemeine Chemie, vol. 257, p. 139 (1948).